Dec. 4, 1951     L. C. KEMP, JR     2,577,017
PREPARATION OF HEAVY HYDROCARBONS OF HYDROGEN ISOTOPES
Filed Nov. 23, 1948
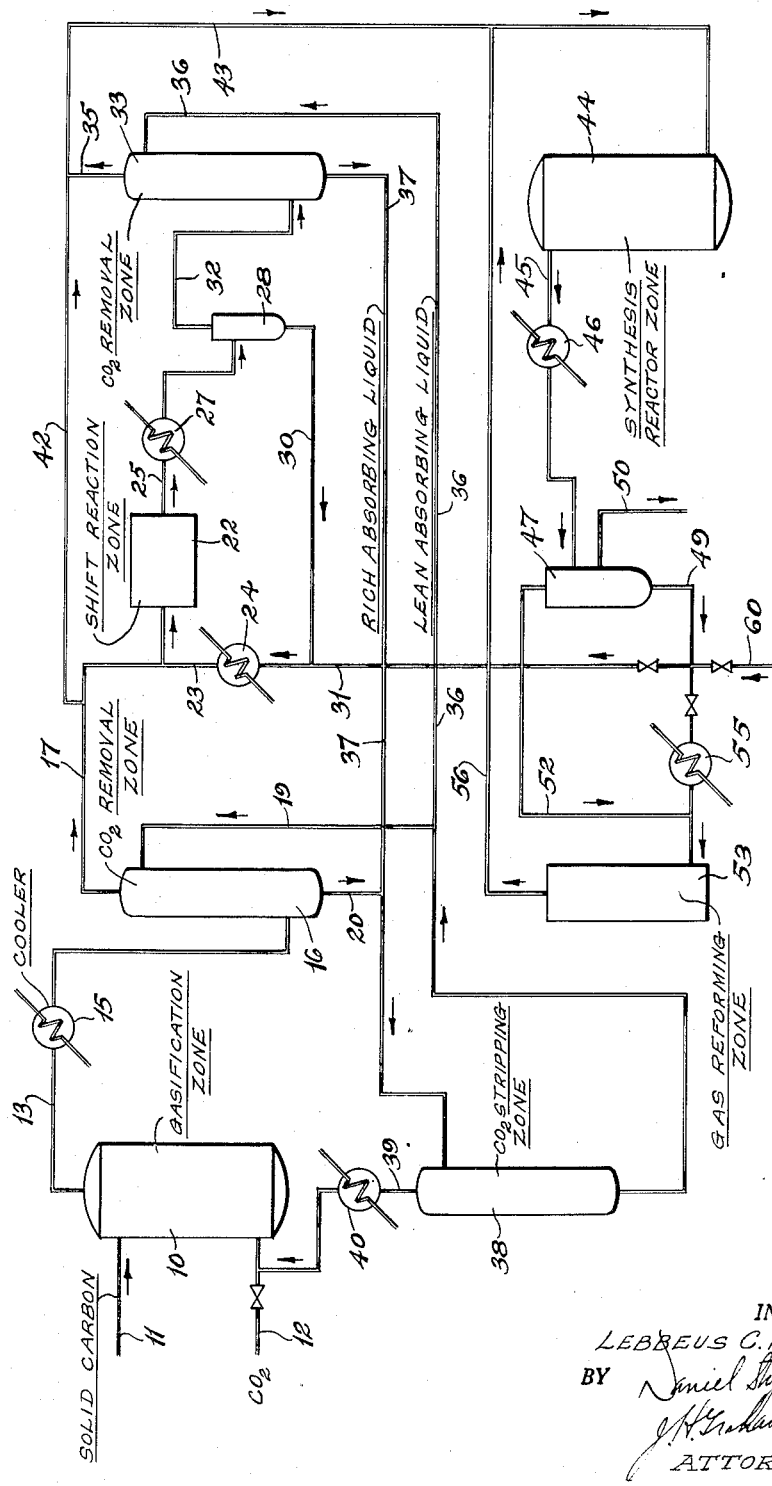
INVENTOR.
LEBBEUS C. KEMP, JR.
BY
ATTORNEYS

Patented Dec. 4, 1951

2,577,017

UNITED STATES PATENT OFFICE 2,577,017

PREPARATION OF HEAVY HYDROCARBONS OF HYDROGEN ISOTOPES

Lebbeus C. Kemp, Jr., Scarsdale, N. Y., assignor to The Texas Company, New York, N. Y., a corporation of Delaware Application November 23, 1948, Serial No. 61,592

9 Claims. (Cl. 260—449.6)

The present invention relates to the synthesis of hydrocarbons of hydrogen isotopes in which the isotope of hydrogen has an atomic weight greater than one. It particularly contemplates the production of selected fractions of deuterocarbons and the like from starting materials comprising heavy water and carbon.

The present invention, in its preferred aspect, is directed to the production of desired compounds of carbon, and the aforesaid isotopes of hydrogen having an atomic weight greater than one, to the substantial exclusion of hydrogen of the atomic weight of one; namely, to compounds of carbon with deuterium, or tritium, or both. The products containing essentially deuterium and carbon are referred to herein as deuterocarbons, and for purposes of description, the details of the invention will be largely described in terms thereof.

In accordance with the present invention, a stream of high purity carbon monoxide is prepared, preferably free of the hydrogen isotope having an atomic weight of one. The stream of essentially pure carbon monoxide is converted into a synthesis gas containing regulated proportions of one of the aforesaid isotopes of hydrogen, as for example, deuterium, by reacting a predetermined, regulated portion of the carbon monoxide with the vapor of heavy water under suitable reaction conditions, including an elevated temperature in accordance with the water-gas shift reaction. Under such conditions, the reactants decompose with the production of carbon dioxide and deuterium.

The carbon dioxide is advantageously separated and the resulting deuterium and residual carbon monoxide, preferably in the molar ratio of about 2:1, are passed in contact with a synthesis catalyst, under reaction conditions, to form preferably maximum quantities of the desired products.

The resulting products, withdrawn from contact with the synthesis reaction zone, include the desired fractions of deuterocarbons, together with accompanying, undesired deuterocarbon fractions and the by-product heavy water ($D_2O$). They may also contain usually small quantities of unreacted feed materials.

The desired product fractions are recovered by any suitable means of separation, and residual undesired fractions of the deuterocarbon are subjected to reforming in the presence of the by-product heavy water vapor under reaction conditions effective to form additional synthesis gas consisting of deuterium and carbon monoxide.

Control of the reforming step to maximize yield of reformed synthesis gas may be effected by adjusting the proportion of deuterium oxide relative to deuterocarbons present in the reformer feed, that is to say, either by supplementing the deuterium oxide already present or by separation of the excess, as the case may be.

The residual, reformed stream is continuously recirculated to the synthesis zone such that ultimate conversion of the available deuterium into the desired product fractions is most effectively realized.

It follows, therefore, that the process of the present invention not only provides for maximum utilization of heavy water in the synthesis of the desired product but also enables production of deuterocarbons in which any predetermined portion of the hydrogen atoms are deuterium atoms, as well as desired deuterocarbon fractions substantially free from hydrogen atoms having an atomic weight of one. This follows from the fact that the invention provides a closed system which is readily sealed to the introduction of all but heavy water and selected, high purity carbon. In short, from the standpoint of reactant contamination, the system receives only predetermined feed materials of regulated composition and purity, and discards only minor proportions of non-critical materials.

From the standpoint of the immediately foregoing objective, it is particularly advantageous to effect the formation of the feed stream of carbon monoxide by the interaction of carbon dioxide with free carbon. This permits continual recycle of the carbon dioxide formed by water-gas shifting the heavy water, thereby supplying carbon dioxide in ample quantity to effect the oxidation of the feed to carbon monoxide. As a result, extreme precaution against carryover of deuterium with the separated carbon dioxide is not necessary in that any such carryover is retained in the system and ultimately consumed.

A major overall advantage of the present invention, as above intimated, follows from the essential conservation of the economically critical heavy water, and the resulting substantially complete conversion thereof into the desired products. From a corollary standpoint, the product, as previously shown, is subject to regulation as regards its atomic content of heavy hydrogen, because of the fact that the character and concentration made available for reaction are dependent solely upon the character and purity of the heavy water makeup stream.

In order to illustrate the invention in greater detail, reference is had to the attached drawing, which illustrates more or less diagrammatically one preferred embodiment of the present invention.

Therein, the numeral 10 indicates symbolically a gasification zone for the production of carbon monoxide. Solid carbon supplied to the interior of the gasification chamber from any suitable source through inlet line 11 forms a mass through which carbon dioxide introduced by way of line 12 passes upwardly.

Contact between the carbon dioxide and carbon takes place at elevated temperatures at which the carbon dioxide is reduced to carbon monoxide, that is to say, above 1000° F., and preferably substantially above 2000° F. Accordingly, therefore, the gasification zone is suitably heated, as for example, by the indirect heat transfer from a surrounding combustion zone maintained at a suitably high temperature. In the interest of simplification, and since fired or otherwise heated reactors are known in the art, structural details are omitted. It is frequently desirable to preheat the incoming stream of carbon dioxide.

The solid carbon consumed in the reactor 10 may be introduced, for example, by mechanical feeders. As indicated above, the solid carbon is advantageously a highly purified form of coke or graphite, relatively free from the normal isotope of hydrogen or its water vapor. By providing a solid particle carbon and maintaining it in an aerated or fluid phase in reactor 10, the flow of thermal energy into the zone of reaction is facilitated and the reaction correspondingly improved.

The effluent gas flowing through outlet pipe 13, comprising essentially carbon monoxide, passes through cooler 15 to a gas separation plant 16, where any contained carbon dioxide is removed and the residual carbon monoxide is discharged through outlet pipe 17.

As intimated above, where the gasification reaction occurring in 10 is effected at desirably high temperatures, for example, 2000° to 2500° F. or above, no material amount of carbon dioxide is present in the product, and therefore, the gas separation unit 16 may be omitted, its presence being necessary only in cases where conditions of gasification are less favorable. The gas separation unit 16, however, may embody any suitable carbon dioxide separation means, as for example, the so-called Girbotol system employing as an absorbent an aqueous solution of monoethanolamine or so-called "caustic scrubbing."

It is advantageous, however, where the objective is to produce a deuterocarbon substantially free from hydrogen of an atomic weight of one, to provide for positively preventing carryover of even small proportions of normal water vapor into the system. This may be effected by providing physical or chemical drying instrumentalities, not shown, into the outlet pipe of the absorption tower, or by effecting the separation of carbon dioxide by an aqueous absorbent, using essentially heavy water. Suitable aqueous absorbents are, for example, trisodium-phosphate or a mixture of trisodium and disodium deuterium phosphate dissolved in heavy water, adjusted to the proper pH for effecting absorption and later desorption of the carbon dioxide. As indicated, a lean absorbing liquid is introduced to the upper portion of the tower through line 19 and the resulting rich liquid is withdrawn from the lower extremity through line 20.

The major portion of the purified carbon monoxide in line 17 passes into a shift reactor 22 in admixture with vapors of heavy water introduced through branch pipe 23 supplied from exchanger or vaporizer 24.

In the shift reaction zone 22, a regulated mixture of carbon monoxide and $D_2O$ vapor meets a water-gas shift reaction catalyst and an elevated temperature at which the reactants are converted into heavy hydrocarbon gas and carbon dioxide.

In general, iron base shift catalysts are preferred combined with any desired modifying agents, additives, promoters, stabilizers and the like such as the oxides of calcium, potassium and magnesium, sodium silicate and the like. Contact temperatures are generally in the range of 400–900° F. It is frequently advantageous to improve the conversion by supplying an excess of $D_2O$ vapor of two or more times the theoretical requirement.

In view of the presence of excess vapors of $D_2O$ in the product stream of free deuterium and carbon dioxide withdrawn through pipe 25, provision is made for their removal, comprising condenser 27 and decanter 28. The condensed liquid $D_2O$ is pumped through recycle line 30 to branch line 31, which communicates with the heat exchanger 24, as indicated, for return to the shift reaction zone.

The residual mixture of deuterium and carbon monoxide passes overhead through pipe 32 into a second carbon monoxide separating zone represented by the reference numeral 33, meeting the requirements discussed in connection with the carbon dioxide separating unit 16. In the embodiment shown, the absorption tower 33 receives lean absorbing liquid from pipe 36 and discharges the rich absorbent through pipe 37.

The rich absorbent passes into stripping tower 38, where the absorbed carbon dioxide is separated and discharged through pipe 39, and the resulting lean absorbent liquid is supplied to aforementioned pipe 36. Dephlegmator 40 returns undesired liquid vapors to the stripping zone 38. The resulting stream of carbon dioxide in pipe 39 joins with the inlet pipe 12 to provide the normal carbon dioxide requirements of the gasification zone 10.

In the absorbing zone 33, carbon dioxide is selectively removed from the gas stream by the absorbing liquid and the residual gas comprising mainly deuterium is discharged through line 35, and as indicated, is injected directly into line 42, carrying the branch stream of carbon monoxide from line 17 and forming a predetermined synthesis gas mixture of deuterium and carbon monoxide which passes through pipe 43 to the synthesis reactor 44.

It may be pertinent to note that in lieu of splitting or bypassing a portion of the carbon monoxide through line 42, the entire stream in pipe 17 may be conducted through the shift reaction zone. In fact, this may, in many cases, be advantageous in promoting the regulated formation of free deuterium and enabling direct formation of synthesis gas of the desired composition.

The synthesis gas delivered through pipe 42 preferably comprises deuterium and carbon monoxide in a molar ratio of about 2:1, and not usually less than 1:1, or substantially above 3:1. In the synthesis reactor 44, the upflowing gases pass in contact with a typical synthesis catalyst comprising a metal of the iron group such as iron, cobalt and nickel or ruthenium, preferably in solid particle form, and usually accompanied by one or more modifying agents such as alumina, alkali or alkaline earth metal oxides or the like. Provision, not indicated in the flow sheet, is advantageously made to maintain a reaction temperature in the range of about 350–800° F. and preferably a pressure up to about 500 p. s. i. Broadly, however, temperatures as low as 150° F. and pressure as high as 3000 p. s. i. are contemplated.

The effluent product gases withdrawn through pipe 45 pass through a condenser 46 to a decanter 47 where the normally liquid fractions separate into a lower aqueous layer withdrawn through pipe 49 and a superimposed oily layer drawn off for subsequent use or treatment through pipe 50. The normally gaseous residue comprising essentially undesired gaseous deuterocarbons, is passed overhead through pipe 52 to a reformer 53. Upon entering the reformer, the undesired fractions are mixed with a regulated quantity of the steam or vapor of the by-product deuterium oxide carried by pipe 49, after first passing through heat exchanger or vaporizer 55, as indicated.

The gas reforming zone 53 operates essentially to effect reaction of the gaseous deuterocarbon fractions with the $D_2O$ to form additional quantities of free deuterium and carbon monoxide which are withdrawn through outlet pipe 56 and recycled to pipe 43 leading to the inlet of the synthesis reactor, as indicated.

Gas reforming, per se, forms no part of the invention and may be effected in any conventional manner and in the presence of a reforming catalyst or not, as desired. For example, at temperatures below about 1800° F., catalysts are usually necessary, while above this range, they may be omitted. It will be understood from the foregoing that the gas reforming zone is supplied with the requisite thermal energy to support the reaction and maintain the desired reaction temperature; as, for instance, by indirect heating from an external combustion chamber or the like, not shown.

In the event that the by-product $D_2O$ withdrawn through line 49 exceeds the requirements of the gas reformer 53, any desired portion thereof may be diverted through previously mentioned pipe 31, supplying the shift reaction zone 22. Additional $D_2O$ may be introduced, as required, from any suitable source through inlet pipe 60. Provision, not shown, is desirably made for venting a portion of the reactant gases to overcome undesired build-up of contaminants. Such may take the form of a valved vent associated with pipe 52 or any other convenient part of the system.

While the foregoing embodiment is obviously directed primarily toward the recovery of normally liquid product fractions, it should be understood that, in the broad aspect of the invention, other desired fractions may be selectively recovered by proper selection of the product separating instrumentalities, the undesired fractions being returned to the reforming zone. For example, where deuterowax is desired, provision may be made for periodically extracting the wax from the surfaces of the catalyst. In such case, undesired, normally liquid, as well as normally gaseous fractions of the deuterocarbon may be subjected to reformation into synthesis gas. By the same token, should the desired products be normally gaseous fractions, the normally liquid residue is susceptible to reforming for maximum yield of desired products.

In this connection, it may be noted that the predominating deuterocarbon product fractions depend upon reaction conditions such as temperature, pressure and catalyst employed. For example, operation of the synthesis reaction zone 44 with a typical, fluidized iron catalyst at a temperature of about 650° F. and a pressure of about 200–500 p. s. i. g., is normally characterized by the predominant formation of normally liquid fractions of about the motor gasoline boiling range. Alternatively, a product distribution favoring deuterowax may be realized in the presence of a cobalt catalyst at temperatures of about 350–400° F. and pressures of from atmospheric to 75 p. s. i. g. and higher. Yet further control improvement is frequently realized by continuously recycling to the synthesis zone 44 a portion of the gas stream in pipe 52.

As above intimated, the foregoing remarks are equally applicable to the production of compounds of carbon and tritium.

Obviously, many modifications and variations of the invention, as hereinbefore set forth, may be made without departing from the spirit and scope thereof, and therefore, only such limitations should be imposed as are indicated in the appended claims.

I claim:

1. In the production of desired deuterocarbon fractions, the steps which comprise preparing carbon monoxide by the reaction of carbon dioxide with free carbon at an elevated temperature in a gasification zone, reacting a portion of the carbon monoxide thus formed with $D_2O$ in a shift reaction zone, under reaction conditions including an elevated temperature at which the reactants are shifted to form free deuterium and carbon dioxide, separating carbon dioxide from the resultant stream and supplying said separated carbon dioxide to said gasification zone for the production of additional carbon monoxide, passing resulting deuterium and an unconverted portion of said carbon monoxide in contact with a synthesis catalyst in a synthesis zone maintained at a temperature and pressure such that a substantial portion at least of the feed is converted into deuterocarbons, withdrawing from contact with said catalyst a reaction effluent including said deuterocarbons, together with by-product $D_2O$, recovering therefrom desired fractions of deuterocarbon, subjecting remaining deuterocarbon fractions to contact with $D_2O$ in a reforming zone, under conditions including an elevated temperature effective to reform free deuterium and carbon monoxide, and recycling said reformed products to the inlet of said synthesis zone.

2. The method according to claim 1, wherein a portion at least of said by-product $D_2O$ is supplied as a feed to said shift reaction zone.

3. In the synthesis of desired compounds composed of carbon and an isotope of hydrogen having an atomic weight greater than one, the steps which comprise preparing a stream of carbon monoxide by reacting carbon with carbon dioxide at an elevated temperature, in a gasification zone, reacting a portion of said carbon monoxide stream with heavy water under water-gas shift reaction conditions to convert said last-named reactants into a mixture of free hydrogen isotope and carbon dioxide, separating carbon dioxide from the mixture and supplying said separated gas as feed carbon dioxide to said gasification zone, subjecting the resulting free hydrogen isotope in admixture with the unconverted portion of said carbon monoxide to contact with a hydrocarbon synthesis catalyst under reaction conditions effective for substantial production of isotopic hydrogen-carbon compounds with the formation of by-product heavy-water, withdrawing the effluent products from contact with the catalyst, recovering therefrom desired isotopic hydrogen-carbon compounds, reacting residual isotopic hydrogen-carbon compounds with heavy water under reforming conditions effective to yield a mixture of free hydrogen isotope and carbon monoxide, and recycling said reformed products into contact with said hydrocarbon synthesis catalyst.

4. The method defined in claim 3 wherein said hydrocarbon synthesis catalyst is effective to convert the reactants directly into isotopic hydrogen-carbon compounds with the formation of water as the predominant by-product.

5. The method defined in claim 3 wherein the hydrocarbon synthesis catalyst comprises essentially cobalt.

6. The method defined in claim 3 wherein the hydrocarbon synthesis catalyst comprises essentially ruthenium.

7. In the synthesis of desired compounds composed of carbon and an isotope of hydrogen having an atomic weight greater than one, the steps which comprise preparing a stream of carbon monoxide by reacting carbon with carbon dioxide at an elevated temperature, in a gasification zone, reacting a portion of said carbon monoxide stream with heavy water under water-gas shift reaction conditions to convert said last-named reactants into a mixture of free hydrogen isotope and carbon dioxide, separating carbon dioxide from the mixture and supplying said separated gas as feed carbon dioxide to said gasification zone, subjecting the resulting free hydrogen isotope in admixture with the unconverted portion of said carbon monoxide to contact with a hydrocarbon synthesis catalyst under reaction conditions whereby substantial production of isotopic hydrogen-carbon compounds takes place, withdrawing from contact with the catalyst the effluent products of reaction and recovering isotopic hydrogen-carbon compounds therefrom.

8. In the production of desired deuterocarbons, the steps which comprise preparing a stream of carbon monoxide by reacting carbon with carbon dioxide at an elevated temperature, in a gasification zone, reacting a portion of said carbon monoxide stream with $D_2O$ under water-gas shift reaction conditions to convert said last-named reactants into a mixture of free deuterium and carbon dioxide, separating carbon dioxide from the mixture and supplying said separated gas as feed carbon monoxide to said gasification zone, subjecting the resulting free deuterium in admixture with the unconverted portion of said carbon monoxide to contact with a hydrocarbon synthesis catalyst under reaction conditions whereby substantial production of deuterocarbon compounds take place, withdrawing the effluent products from contact with the catalyst and recovering therefrom desired deuterocarbons.

9. The method according to claim 8 wherein residual deuterocarbons remaining after recovery of the desired deuterocarbons are subjected to reaction with $D_2O$ under reforming conditions to yield a mixture of free deuterium and carbon monoxide and wherein said reformed products are recycled into contact with said hydrocarbon synthesis catalyst.

LEBBEUS C. KEMP, JR.

REFERENCES CITED

The following references are of record in the file of this patent:

UNITED STATES PATENTS

| Number | Name | Date |
|---|---|---|
| 2,257,293 | Dreyfus | Sept. 30, 1941 |
| 2,347,682 | Gunness | May 2, 1944 |